(12) United States Patent
Tsai et al.

(10) Patent No.: US 8,166,035 B2
(45) Date of Patent: Apr. 24, 2012

(54) GRID-BASED DATA CLUSTERING METHOD

(75) Inventors: Cheng-Fa Tsai, Pingtung County (TW); Chien-Sheng Chiu, Taoyuan County (TW)

(73) Assignee: National Pingtung University of Science & Technology, Pingtung County (TW)

( * ) Notice: Subject to any disclaimer, the term of this patent is extended or adjusted under 35 U.S.C. 154(b) by 214 days.

(21) Appl. No.: 12/652,979

(22) Filed: Jan. 6, 2010

(65) Prior Publication Data
US 2011/0040758 A1 Feb. 17, 2011

(30) Foreign Application Priority Data
Aug. 17, 2009 (TW) ............... 98127600 A

(51) Int. Cl.
*G06F 17/30* (2006.01)
(52) U.S. Cl. ............. 707/737; 707/776
(58) Field of Classification Search ............ 707/737, 707/776
See application file for complete search history.

(56) References Cited

U.S. PATENT DOCUMENTS

| 5,832,182 | A | 11/1998 | Zhang et al. |
| 6,003,029 | A | 12/1999 | Agrawal et al. |
| 6,549,907 | B1 | 4/2003 | Fayyad et al. |
| 6,640,227 | B1 | 10/2003 | Andreev |
| 2002/0029235 | A1* | 3/2002 | Lock et al. ............ 708/814 |

* cited by examiner

*Primary Examiner* — Hosain T Alam
*Assistant Examiner* — Johnese Johnson
(74) *Attorney, Agent, or Firm* — Muncy, Geissler, Olds & Lowe, PLLC

(57) ABSTRACT

A grid-based data clustering method comprises: a parameter setting step, a partition step, a searching step, a seed-classifying step, an extension step, and a termination step. Through the above-mentioned steps, data in a data set are disposed in a plurality of grids, and the grids are classified into dense grids and uncrowded grids for a cluster to extend from one of the dense grid to gradually combine data in other dense grids nearby. Consequently, convenience in parameter setting, efficiency and accuracy in data clustering, and performance in noise filtering are achieved.

9 Claims, 7 Drawing Sheets

GRID-BASED DATA CLUSTERING METHOD

BACKGROUND OF THE INVENTION

1. Field of the Invention

The present invention relates to a data clustering method, particularly to a method for grid-based data clustering.

2. Description of the Related Art

With the progress and development in information technology, the number of data stored in a database is substantially increasing. "Data mining" is generally utilized in the field of data management to identify useful information hidden in data stored in a database and to draw concealed features of and relationships between the said data, so as to establish a data-analyzing model. Besides, through data clustering method of data mining, degree of correlation between the data can be quickly obtained, and thus data with great similarity of a feature can be identified as in the same cluster. Presently, there are kinds of data clustering methods being widely used, and two general kinds of them are now introduced as the following.

"K-means" data clustering method was proposed by McQueen in 1967, which is a data clustering method based on partitioning operation and processed by the following steps. For the first step thereof, cores "x" with a total of "k" are randomly selected from all data within a database, with the number "k" being the required number of resulting clusters. For the second step, distances between the cores and other data in the database are verified, and then each of the said other data is designated to be in a cluster containing the nearest one of the cores according to the distance verifying result. For the third step, after all the data are designated, a new core for each cluster is determined by finding a datum located closest to a center of a cluster and checked whether the new core and the original core of the cluster are identical, and replaces the original core while they are different. After the third step, the second and third steps operate again if the new core and original core in any one of the clusters are different, and the whole data clustering process terminates if all the centers in the clusters are settled. The primary advantage of K-means data clustering method is high clustering speed even though there is a great number of data in the database. However, owing to the originally and randomly selected cores "x," the K-means data clustering method may easily lead to different clustering results for the same database. Namely, the clustering result of the K-means data clustering method is unstable. Besides, because the way for designating a datum to a cluster merely depends on the result of distance-comparison between the cores and the said other data, result in clustering accuracy of K-means clustering process is usually not ideal.

Another data clustering method, named DBSCAN data clustering method, is proposed by M. Ester et al. in 1996, which is a data clustering method of density-based operation and processed by the following steps. Regarding to the first step thereof, a core point is randomly selected from all data points within a database. For the second step, a number of data points within an area of a searching radius and centered at the core point is counted, which is called a search action, to identify whether the number of the data points in the area exceeds or equals to a threshold value. If the said number is less than the threshold value when the search action of the core point finishes, the core point will be regarded as a noise data. Alternatively, if the said number is larger than the threshold value, the data points in the area are designated as in the same cluster, and then other data points in the area go through the said search action to extend the cluster. Besides, the cluster keeps extending until a number of data points within any area is less than the threshold value. For the third step, data points other than those having been designated are identified and then go through the above-mentioned first and second steps till each of all the data points is designated to a cluster or regarded as a noise point. This conventional DBSCAN data clustering method is good in noise filtering and suits database with irregularly arranged data points. However, because the said search action has to be proceeded for every data points, a long processing time is unavoidable and fatal.

Accordingly, in order to solve the unstable clustering result or the long processing time, the above-mentioned data clustering methods are further improved therefore.

An "ANGEL" data clustering method of grid-based operation, a combination of partitioning operation and density-based operation, is recently proposed. The ANGEL data clustering method comprises steps of: creating a feature space having a plurality of cubes and disposing a plurality of data stored in a database into the cubes, and then defining some of the cubes as populated cubes according to the number of data disposed in the cubes; identifying whether the data within each of the populated cubes being evenly distributed or not, and defining the populated cubes having evenly distributed data as major cubes and those having unevenly distributed data as minor cubes; detecting the minor cubes by the DBSCAN data clustering method to search for border data disposed near borders of each minor cube, and then comparing the border data with the data in the major cubes to combine at least one of the border data with the data in the major cubes; and designating all the data combined with each other as in the same cluster and recursively processing the above procedures to cluster all the data stored in the database. In comparison with the K-means data clustering method, the ANGEL data clustering method is better in result stability and noise filtering. Besides, in comparison with the DBSCAN data clustering method, the ANGEL data clustering method can process faster. However, it is difficult for a user to determine initial parameters required for processing the ANGEL data clustering method according to various purposes and needs.

Therefore, a G-TREACLE data clustering method is then proposed by the inventor of the ANGEL data clustering method, which comprises density-based, grid-based, and hierarchical operations to improve the ANGEL data clustering method by replacing the DBSCAN data clustering method therein with the said hierarchical operation. In detail, being similar to the initial steps of the ANGEL data clustering method, the G-TREACLE data clustering method also defines populated cubes in the same way. However, instead of identifying major and minor cubes form those populated cubes, this method defines a "Dynamic-Gradient-Threshold (DGT)" value to filter out noise data and thus identifies some of the populated cubes as border cubes that have border data of any cluster. And then, a searching radius and a threshold value are given for the data in each border cube to complete the hierarchical operation, and, finally, data in the same cluster are identified and grouped. Although speed of processing of this method is faster then that of the ANGEL data clustering method, there are still too many parameters waiting for a user to determine.

As a result, regarding to the above two enhanced data clustering methods, even if performances in clustering accuracy and processing speed are improved, they are still inconvenient for use owing to the parameter-determination. Hence, there is a need of improving the conventional data clustering methods.

SUMMARY OF THE INVENTION

The primary objective of this invention is to provide a grid-based data clustering method, which can be processed with easy parameter setting, so as to be conveniently used.

The secondary objective of this invention is to extend any single cluster by combining data in dense grids with data in a processing dense grid abutted against by the dense grids. Consequently, efficiency in data clustering is improved.

Another objective of this invention is to fix the data clustering result obtained via a threshold ratio with a flawed value, so that good performances in noise filtering and clustering accuracy are achievable.

The grid-based data clustering method in accordance with an aspect of the present invention includes: a parameter setting step setting a size value and a threshold ratio; a partition step dividing an area including a plurality of data into a plurality of grids; a searching step counting one of the grids as a seed on a seed list, with data in the grid having not been designated in any cluster, a number of the data in the grid being above a density standard, and the grid being regarded as a dense grid; a seed-classifying step including a fetching action and a judging action, with the fetching action picking out a first seed on the seed list to be a processing seed and canceling the first seed from the seed list, with the judging action determining whether the processing seed is a dense grid or not and executing an extension step if the processing seed is a dense grid or executing the fetching action again if the processing seed is not a dense grid; the extension step grouping up data in the processing seed, examining grids abutting against the processing seed whether the data in the examined grids have been designated in any cluster or not, combining the grouped data in the processing seed into a cluster if the data in the examined grids have been designated in the cluster or designating the grouped data into a single cluster, regarding any of the examined grid with no datum designated in any cluster as a seed and adding the seed onto the seed list, counting a total of the seeds on the seed list, and executing a termination step if there is no seed on the seed list or executing the seed-classifying step again if there is still at least one seed on the seed list; and the termination step determining whether the data in all the dense grids have been designated in any cluster or not, and terminating the grid-based data clustering method if data in any dense grids have been designated in a cluster or executing the searching step if data in any dense grids have not been designated in a cluster.

In an example, the density standard is a product of the threshold ratio and a number of data in a densest grid, with the densest grid being a grid with the greatest number of data among all the grids.

The grid-based data clustering method in accordance with another aspect of the present invention includes: a parameter setting step setting a size value and a threshold ratio; a partition step dividing an area including a plurality of data into a plurality of grids; a searching step counting one of the grids as a seed on a seed list, with data in the grid having not been designated in any cluster, a number of the data in the grid being above a density standard, and the grid being regarded as a dense grid; a seed-classifying step including a fetching action and a judging action, with the fetching action picking out a first seed on the seed list to be a processing seed and canceling the first seed from the seed list, with the judging action determining whether the processing seed is a dense grid or not and executing an extension step if the processing seed is a dense grid or executing a fixing step if the processing seed is not a dense grid; the fixing step determining whether a total of dense grids abutting against the processing seed reaches a reference value, and switching the processing seed to a dense grid and executing a extension step if the total of dense grids abutting against the processing seed reaches the reference value or executing the seed-classifying step if the total of dense grids abutting against the processing seed does not reach the reference value; the extension step grouping up data in the processing seed, examining grids abutting against the processing seed whether the data in the examined grids have been designated in any cluster or not, combining the grouped data in the processing seed into a cluster if the data in the examined grids have been designated in the cluster or designating the grouped data into a single cluster, regarding any of the examined grid with no datum designated in any cluster as a seed and adding the seed onto the seed list, counting a total of the seeds on the seed list, and executing a termination step if there is no seed on the seed list or executing the seed-classifying step again if there is still at least one seed on the seed list; and the termination step determining whether the data in all the dense grids have been designated in any cluster or not, and terminating the grid-based data clustering method if data in any dense grids have been designated in a cluster or executing the searching step if data in any dense grids have not been designated in a cluster.

Further scope of the applicability of the present invention will become apparent from the detailed description given hereinafter. However, it should be understood that the detailed description and specific examples, while indicating preferable embodiments of the invention, are given by way of illustration only, since various will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

Figure 1:
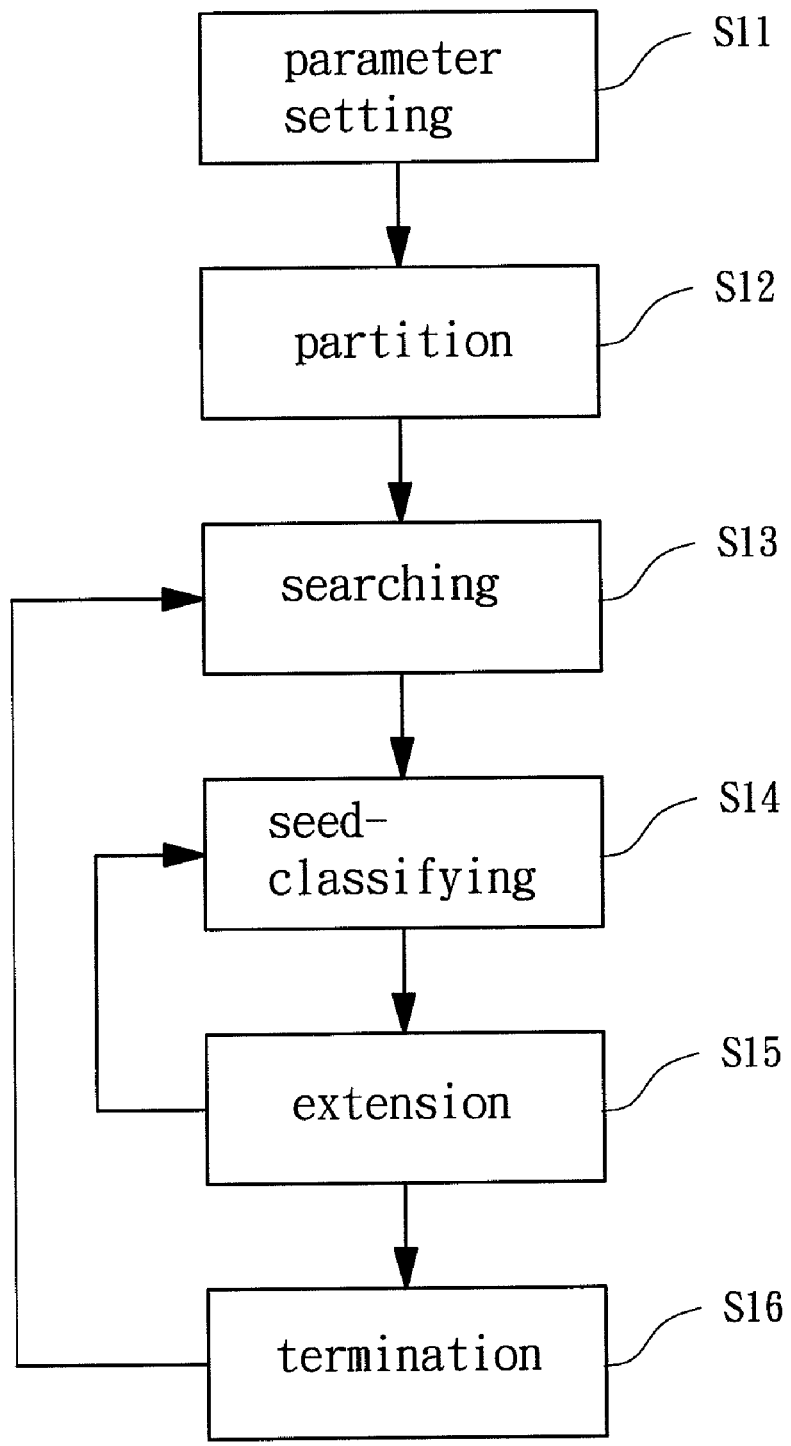
FIG. 1 is a flow chart illustrating a grid-based data clustering method in accordance with a first embodiment of the present invention.

In the various figures of the drawings, the same numerals designate the same or similar parts. Furthermore, when the term "first", "second" and similar terms are used hereinafter, it should be understood that these terms are reference only to the structure shown in the drawings as it would appear to a person viewing the drawings and are utilized only to facilitate describing the invention.

DETAILED DESCRIPTION OF THE INVENTION

Figures 2, 3:
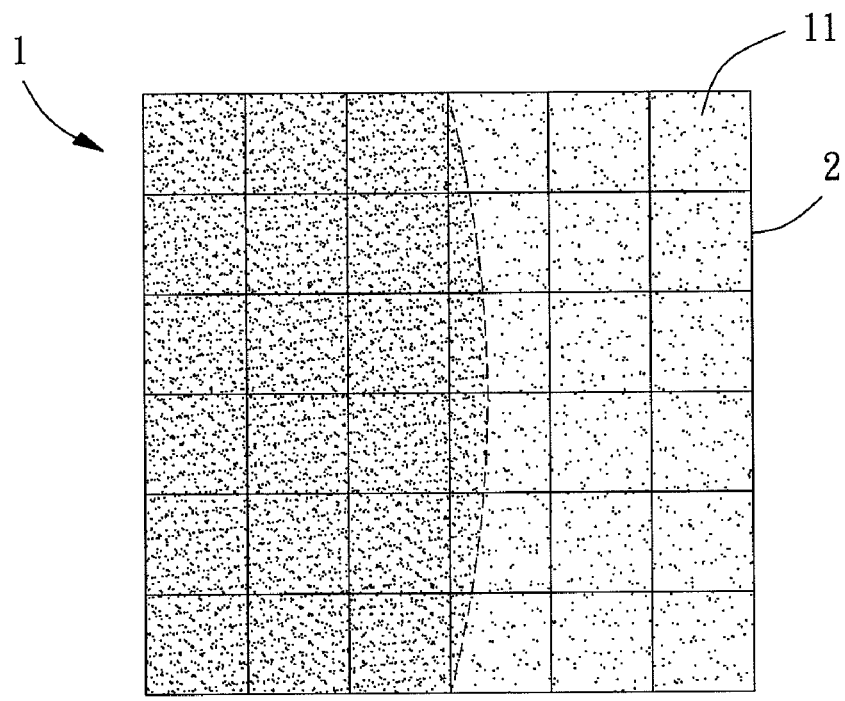
FIG. 2 is a schematic view of a result in accordance with the first embodiment of the present invention after a "partition" step is just performed.
FIG. 3 is a schematic view of a result in accordance with the first embodiment of the present invention after a "searching" step is just performed.

Referring to FIG. 1, in accordance with a first embodiment of the present invention, the present grid-based data clustering method including steps of "parameter setting S11," "partition S12," "searching S13," "seed-classifying S14," "extension S15" and "termination S16" to perform the data clustering efficiently and accurately. Besides, the present invention is executed by a structure with a computer and a database, and a data set 1 comprising a plurality of data 11 is stored in the database in advance as shown in FIG. 2.

In the "parameter setting" step S11, a size value corresponding to a grid size and a threshold ratio between 0 and 1 are set. A relationship between the size value and the grid size is further illustrated with an example shown as the following. When the data 11 are two-dimensionally disposed within an area, wherein the data set 1 is wholly included, of a 100-by-100 square with 100 units in length for each dimension is defined, the area in each dimension will be divided into 50 parts if the size value is 2; namely, the area will be partitioned into 2500 parts.

Furthermore, with reference to FIGS. 1 though 3, in the "partition" step S12, the area wherein the data set 1 is wholly included is divided into a plurality of grids 2 according to the size value, so that all the data 11 are disposed in the plurality of grids 2. Besides, a number of the data 11 in each grid 2 is digitally shown in FIG. 3.

Now, please refer to FIGS. 1 through 4. In the "searching" step S13, a density standard is utilized to count one of the grids 2, wherein the data 11 is not designated in any cluster and whose number of data 11 is above the density standard for the said grid 2 to be regarded as a dense grid 2b, as a seed on a seed list 3. Obviously, for every single cluster, when the searching step S13 is processed for the first time, there must be only one seed obtained on the seed list 3. Specifically, the density standard is a product of the threshold ratio and a number of data 11 in a densest grid 2a, which is a grid 2 with the greatest number of data 11 therein among all the grids 2, as shown in the following:

$$SC = HDC * TV,$$

wherein the "SC" represents the density standard, the "HDC" represents the number of data 11 within the densest grid 2a, and the "TV" represents the threshold ratio. Preferably, the grid 2 counted as the first seed in the seed list 3 by the searching step S13 is the densest grid 2a. For instance, referring to FIG. 3, the number of the densest grid 2a is 350 while the threshold ratio is 0.5, and thus the density standard can be obtained as 175. Accordingly, grids 2 with numbers of data 11 above 175 are identified as dense grids 2b including the densest grid 2a, and those with numbers of data 11 less than 175 are identified as uncrowded grids 2c. Besides, regarding to the seed list 3, with reference to FIG. 4, it is a list for any of the grids 2 in which the data 11 are still undesignated in any cluster to be orderly listed as a first seed 3a, second seed 3b, or third seed 3c etc. Therefore, with the seed list 3, the following seed-classifying step S14 can be processed for seeds therein in order.

Figure 4:
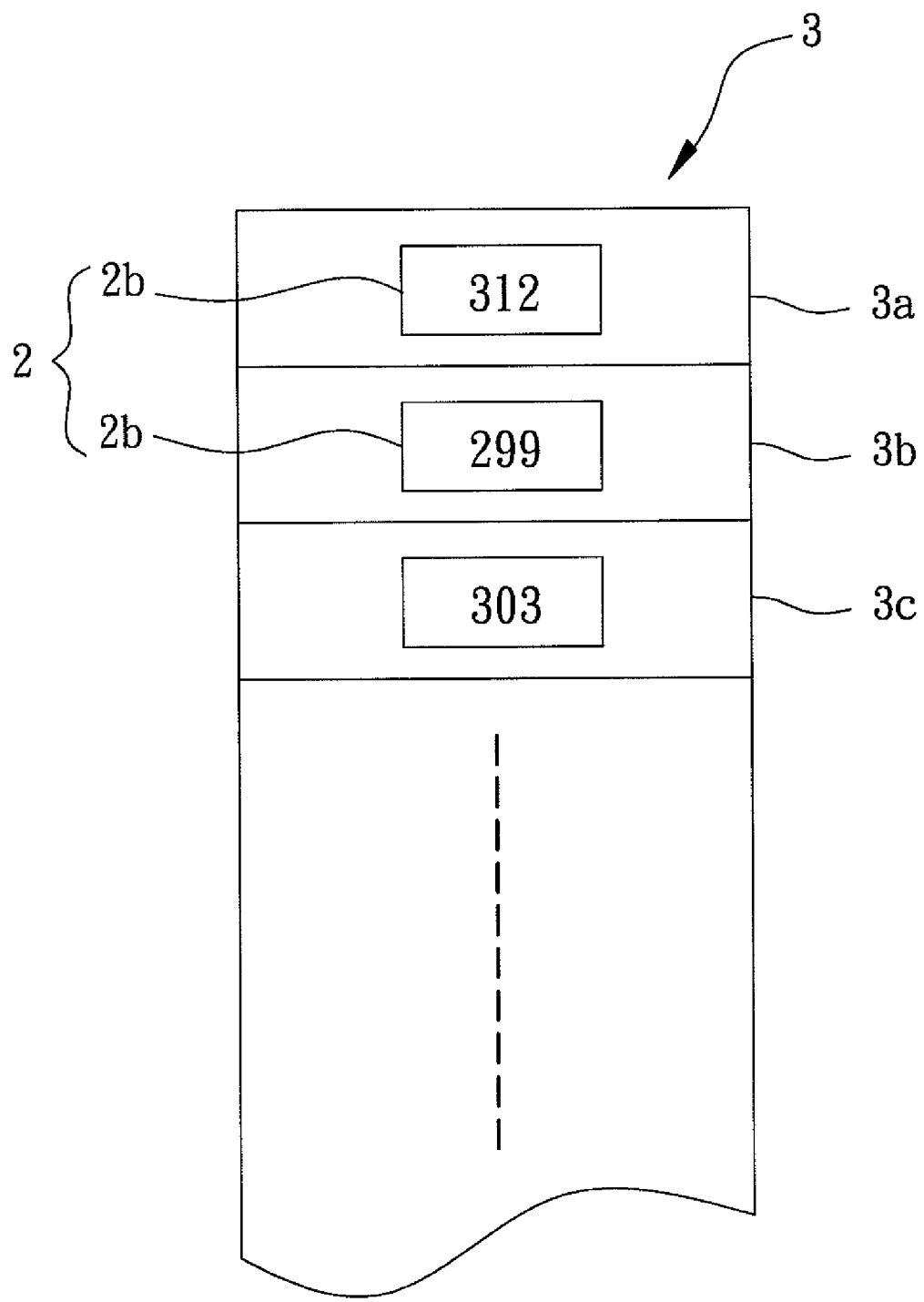
FIG. 4 is a schematic view of a seed list in accordance with the first embodiment of the present invention.
Figure 5A:
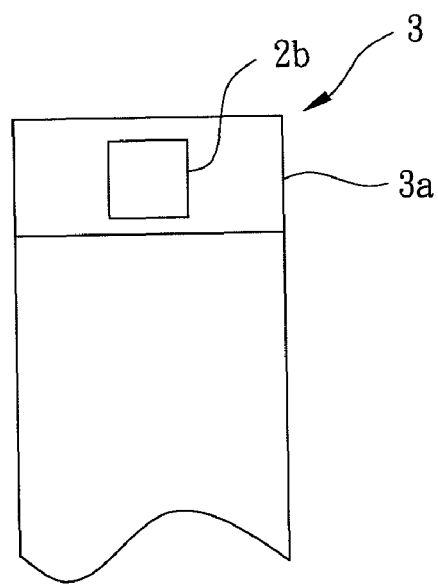
FIG. 5a is a schematic view of the seed list in accordance with the first embodiment of the present invention after the "searching" step is just performed for the first time.
Figure 5B:
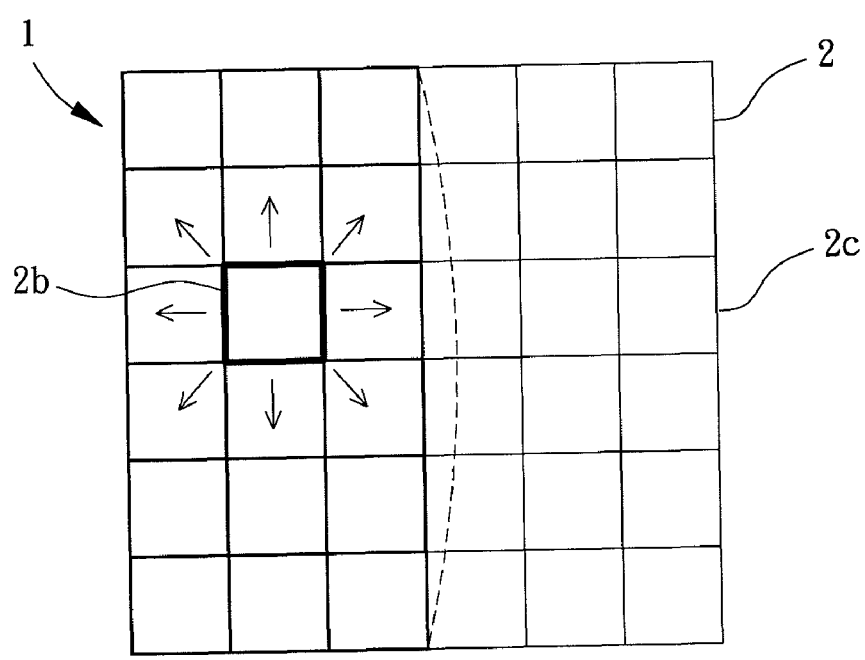
FIG. 5b is a schematic view of a result in accordance with the first embodiment of the present invention after a "seed-classifying" step is just performed.
Figure 6A:
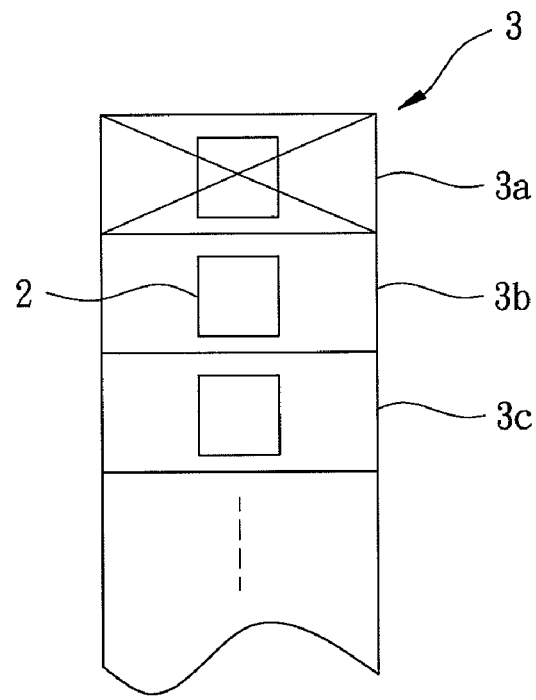
FIG. 6a is a schematic view of the seed list in accordance with the first embodiment of the present invention after the "searching" step is just performed for the second time.
Figure 6B:
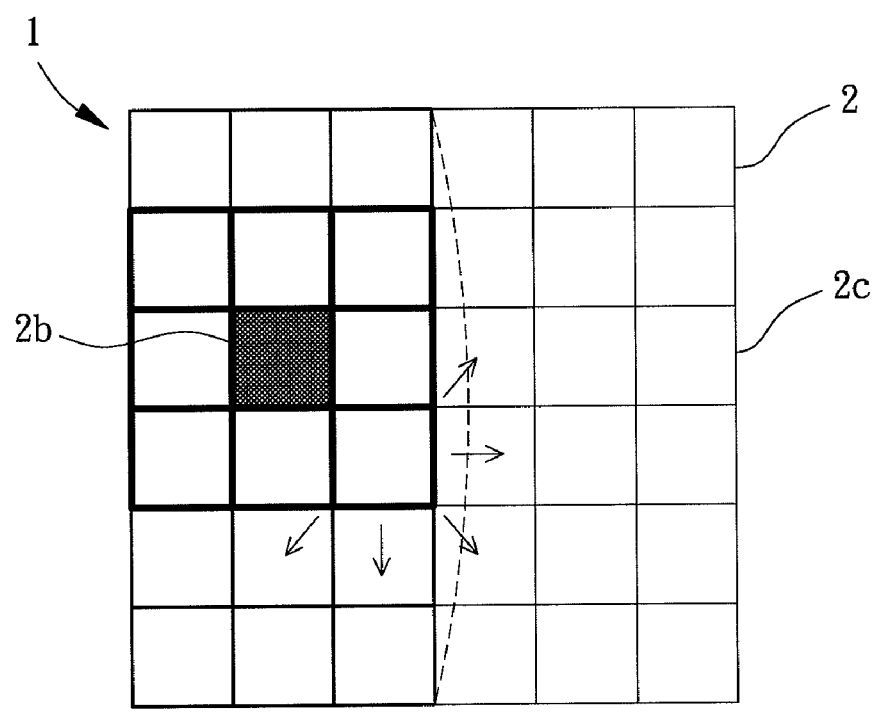
FIG. 6b is a schematic view of a result in accordance with the first embodiment of the present invention.

Please turn to FIGS. 1, 4, 5a, and 6a now. The "seed-classifying" step S14 includes a fetching action and a judging action. In the fetching action, the first one of the seeds on the seed list 3 is regarded as a processing seed to be picked out and cancelled from the seed list 3. In the judging action, the processing seed goes through a judgement to determine whether the processing seed is a dense grid 2b or not. Specifically, in accordance with a result of the judgement, the following extension step S15 will be executed if the said processing seed is a dense grid 2b; otherwise, the fetching action of the seed-classifying step S14 will be executed again. For example, firstly, the first seed 3a on the list 3 shown in FIGS. 4 and 5a is picked out in the fetching action and classified in the judging action. At the mean while, the first seed 3a is cancelled from the seed list 3 and the second seed 3b is upgraded to be the first one of the seeds on the seed list 3 as shown in FIG. 6a. After the judgement action executed toward the first seed 3a, if the first seed 3a is a uncrowded grid 2c, the second seed 3b is then to be picked out and goes through the judgement in the seed-classifying step S14.

Referring to FIGS. 1, 5a, 5b, 6a and 6b, in the "extension" step S15, the data 11 in the said processing seed are grouped up initially, and grids 2 abutting against the processing seed, which are also called abutting grids 2 for the illustration purpose, are respectively examined whether the data 11 therein have been designated in any cluster or not. If the data 11 in an abutting grid 2 have already been designated in a cluster, the grouped data 11 in the processing seed are then combined into the cluster; otherwise, those grouped data 11 are designated in a single cluster. Besides, any abutting grid 2 with no datum 11 designated in any cluster will be regarded as a seed and added onto the seed list 3. Finally, a total of the seeds on the seed list 3 are counted, and the termination step S16 is executed if there is no seed on the seed list 3. Alternatively, while there is still at least one seed on the seed list 3, the seed-classifying step S14 will be executed again. In detail, when the extension step S15 is going to be executed for the first time, there is only one seed listed on the seed list 3 as shown in FIG. 5a, which is the one obtained in the searching step S13. After the extension step S15 is executed for the first time, the data 11 in the seed are designated in a single cluster, while there are eight abutting grids 2 surrounding the seed, regarded as eight new seeds, and listed on the seed list 3 as the second seed 3b, third seed 3c etc. shown in FIG. 6a. With the "eight" seeds instead of none on the seed list 3, the seed-classifying step S14 is executed again for classifying whether a picked one of the eight seeds, that is, the second seed 3b, is a dense grid 2b or not. Moreover, when any one of the eight seeds is also determined as a dense grid 2b in the seed-classifying step S14, the data 11 in this seed will be designated in the cluster including those of the first seed 3a. Thereby, all the data 11 in the adjacent dense grids 2b can be easily and fast designated in a cluster within a short time period for the extension step S15, and thus a high processing speed is achieved.

Finally, please refer to FIGS. 1 through 3 again. In the termination step S16, another judgement for determining whether the data 11 in all the dense grids 2b have been designated in any cluster or not is performed. If all the data 11 in all the dense grids 2b have been designated in a cluster, the present grid-based data clustering method is accordingly terminated; otherwise, the searching step S13 is then executed again.

In the above-disclosed embodiment of the present invention, the threshold ratio is a primary factor dominating the result of the present grid-based data clustering method. In detail, if the threshold ratio is higher than an ideal value, there may be an undesired uncrowded grid 2c falling in a group of dense grids 2b, and this uncrowded grid 2c will thus be regarded as noise. Besides, if the said undesired uncrowded grid 2c locates on an edge of a cluster, a jagged edge of the cluster will thus be resulted. In order to lower the affect caused by the threshold ratio with a flawed value, a second embodiment with an additional fixing step is illustrated as the following.

Figure 7:
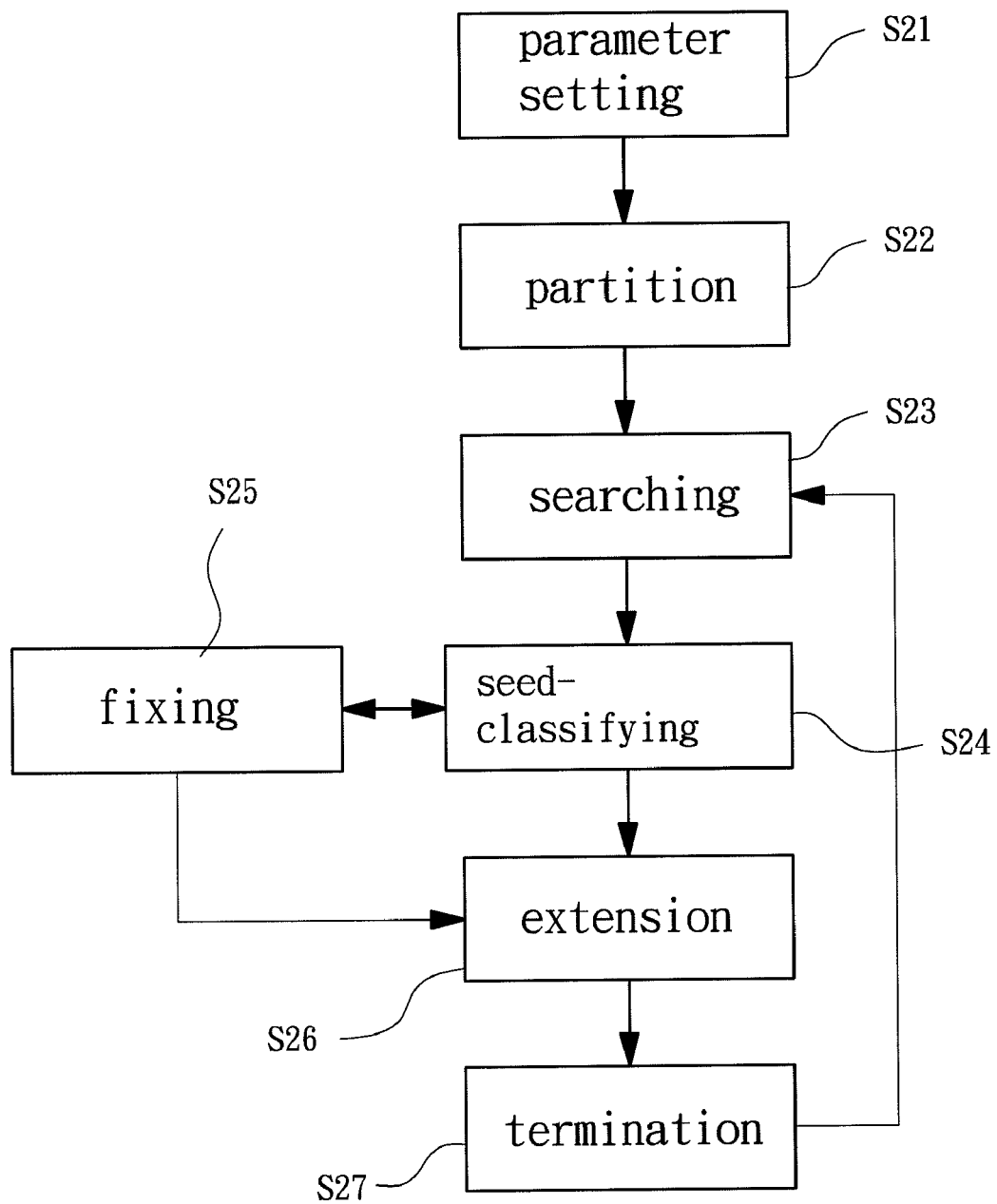
FIG. 7 is a flow chart illustrating a grid-based data clustering method in accordance with a second embodiment of the present invention.

Referring to FIG. 7, the second embodiment of the present invention is shown. The grid-based data clustering method in the second embodiment also provides a parameter setting step S21, a partition step S22, a searching step S23, a seed-classifying step S24, a extension step S26, and a termination step S27, and the additional fixing step S25 is provided as well. Please be noted that the parameter setting step S21, partition step S22, searching step S23, extension step S26, and termination step S27 in this embodiment are identical to the parameter setting step S11, partition step S12, searching step S13, extension step S15, and termination S16 operated in the first embodiment, and redundant words for illustration are thus omitted.

Figure 8:
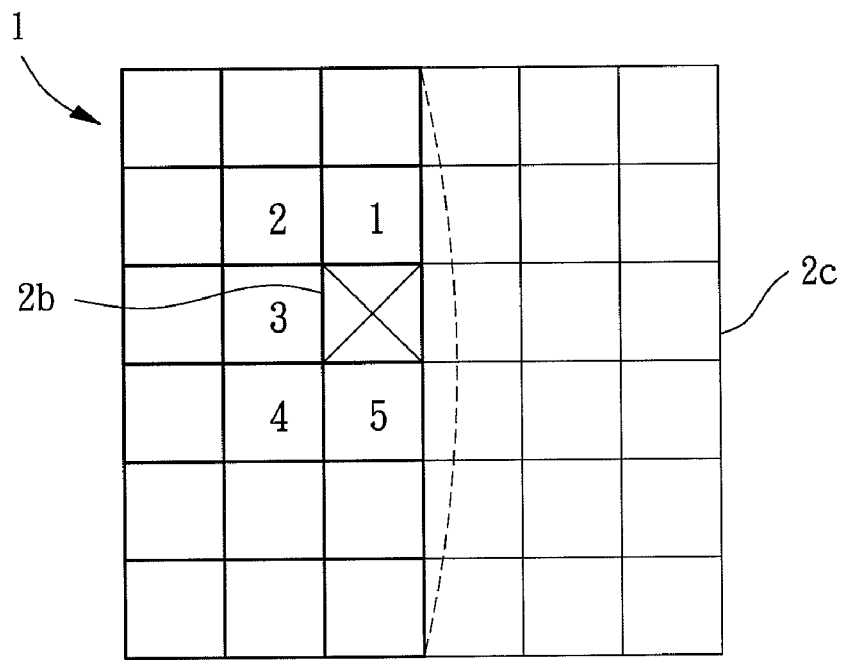
FIG. 8 is a schematic view of a result in accordance with the second embodiment of the present invention after a "fixing" step is just performed.
Figure 9:
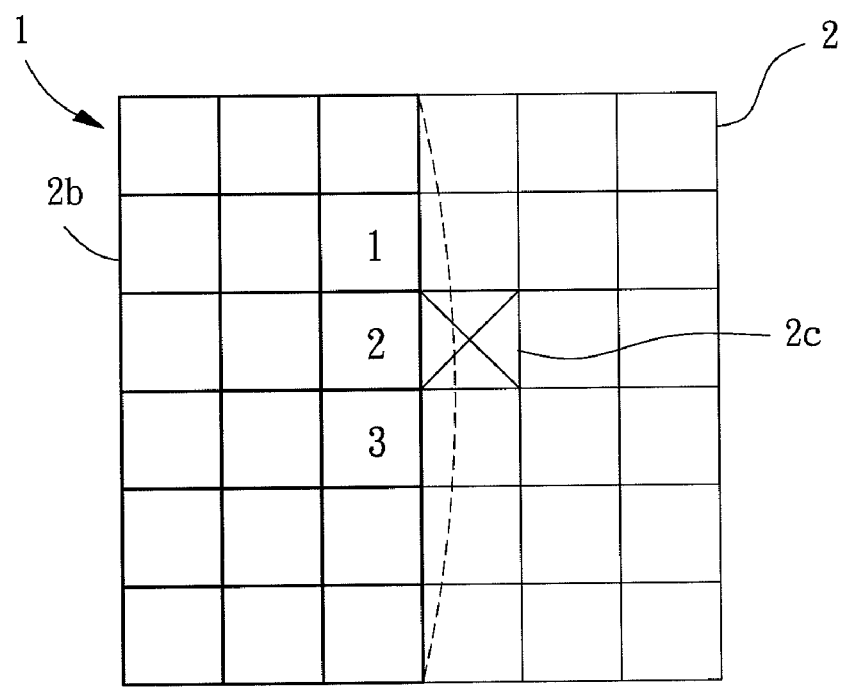
FIG. 9 is a schematic view of another result in accordance with the second embodiment of the present invention after a "fixing" step is just performed.

Now please refer to FIGS. 7 through 9. In this embodiment, what is different from those disclosed already is that the seed-classifying step S24 not only actuates the extension step S26 when the processing seed is a dense grid 2b, but also actuates the fixing step S25 when the processing seed is a uncrowded grid 2c. Besides, the fixing step S25 tells whether a total of dense grids 2b abutting against and surrounding around the processing seed, which is previously regarded as a uncrowded grid 2c, reaches a reference value. Accordingly, if the above criterion is satisfied, the fixing step S25 switches the processing seed from a uncrowded grid 2c to a dense grid 2b for the data 11 therein to be included in a cluster and then actuates the extension step S26. Alternatively, if the above criterion is not satisfied, the fixing step S25 actuates the seed-classifying step S24 and does nothing to the processing seed. For example, if the reference value is previously set as "five" when there are "eight" grids 2 abutting against and surrounding around every seed, a processing seed with a cross as shown in FIG. 8 will be turned to a dense grid 2b when five of the surrounding grids 2 are dense grid 2b. Alternatively, a processing seed, the one with a cross as shown in FIG. 9, will still be a uncrowded grid 2c when only three of the surrounding grids 2 are dense grids 2b. Thereby, clustering accuracy of the present grid-based data clustering method is further improved.

Tables 1 and 2, which are about comparisons between the present invention and the conventional K-means, DBSCAN, ANGEL, and G-TREACLE data clustering methods, are shown for illustrations over executing time cost (TC), clustering correctness rate (CCR), and noise-filtered rate (NFR), while a CPU of Intel Pentium 4 with a frequency of 1.5 GHz, a random-access memory (RAM) with 256 Mbytes, and a Java computer program are implements for realization. Specifically, six data sets identified as data set "A" through "F" are utilized and have numbers of clusters as 4, 5, 10, 4, 2 and 4 respectively. Furthermore, 3,000 of 230,000 data are noise data in the said six data sets shown in Table 1, and 75,000 of 575,000 data are noise data in the said six data sets shown in Table 2. Besides, for the present invention, the size value is 3 and the threshold ratio is 0.25 in these two simulations.

TABLE 1

230,000 data

|  |  | Data Set A | Data Set B | Data Set C | Data Set D | Data Set E | Data Set F |
|---|---|---|---|---|---|---|---|
| K-means | TC | 8.40 | 13.78 | 9.71 | 20.82 | 2.75 | 7.34 |
|  | CCR | 50.03% | 56.24% | 51.14% | 58.10% | 49.95% | 59.05% |
|  | NFR | 0% | 0% | 0% | 0% | 0% | 0% |
| DBSCAN | TC | 1,290.25 | 1,213.90 | 1,221.87 | 1,214.68 | 1,206.03 | 1,210.54 |
|  | CCR | 99.99% | 99.96% | 99.99% | 99.99% | 99.96% | 99.99% |
|  | NFR | 95.08% | 96.51% | 95.22% | 95.38% | 96.41% | 95.81% |
| ANGEL | TC | 3.14 | 3.78 | 6.73 | 6.85 | 9.67 | 11.35 |
|  | CCR | 99.05% | 99.05% | 99.03% | 99.27% | 99.02% | 98.41% |
|  | NFR | 96.68% | 98.11% | 98.65% | 99.01% | 99.08% | 99.12% |
| G-TREACLE | TC | 2.11 | 2.02 | 4.45 | 4.67 | 6.22 | 7.25 |
|  | CCR | 99.02% | 99.24% | 99.01% | 99.37% | 99.50% | 98.99% |
|  | NFR | 98.77% | 99.10% | 99.03% | 98.57% | 98.86% | 99.10% |
| Present invention | TC | 0.89 | 0.92 | 0.92 | 0.93 | 0.89 | 0.92 |
|  | CCR | 98.30% | 98.09% | 98.27% | 98.95% | 99.16% | 98.85% |
|  | NFR | 99.66% | 99.75% | 99.41% | 99.65% | 99.40% | 99.54% |

TABLE 2

575,000 data

|  |  | Data Set A | Data Set B | Data Set C | Data Set D | Data Set E | Data Set F |
|---|---|---|---|---|---|---|---|
| K-means | TC | 18.53 | 16.39 | 59.43 | 43.20 | 7.82 | 19.90 |
|  | CCR | 49.92% | 51.14% | 60.83% | 57.61% | 50.01% | 54.49% |
|  | NFR | 0% | 0% | 0% | 0% | 0% | 0% |
| DBSCAN | TC | 7,480.23 | 7,460.90 | 7,497.90 | 7,470.81 | 7,410.09 | 7,436.84 |
|  | CCR | 99.99% | 99.96% | 99.99% | 99.98% | 99.95% | 99.99% |
|  | NFR | 95.34% | 96.53% | 95.10% | 95.09% | 96.35% | 95.90% |
| ANGEL | TC | 7.92 | 8.21 | 10.87 | 12.55 | 15.43 | 19.66 |
|  | CCR | 99.45% | 99.65% | 99.43% | 99.57% | 99.48% | 99.22% |
|  | NFR | 98.84% | 99.11% | 99.02% | 99.22% | 99.23% | 99.03% |

TABLE 2-continued

| | | 575,000 data | | | | | |
|---|---|---|---|---|---|---|---|
| | | Data Set A | Data Set B | Data Set C | Data Set D | Data Set E | Data Set F |
| G-TREACLE | TC | 6.15 | 5.59 | 7.77 | 8.46 | 10.64 | 15.75 |
| | CCR | 99.39% | 99.51% | 99.37% | 99.76% | 99.75% | 99.12% |
| | NFR | 98.69% | 99.05% | 98.89% | 98.37% | 98.74% | 98.94% |
| Present invention | TC | 1.35 | 1.37 | 1.60 | 1.62 | 1.36 | 1.31 |
| | CCR | 99.14% | 99.34% | 98.71% | 99.21% | 99.48% | 99.46% |
| | NFR | 99.51% | 99.66% | 99.39% | 99.56% | 99.59% | 99.38% |

According to Tables 1 and 2, in comparison with the performances of the conventional data clustering methods, the present invention can largely decrease clustering speed while keeping high clustering correctness rate and noise-filtered rate.

Through the present invention, a user can conveniently complete a data clustering process by setting the size value and threshold ratio only, so as to decrease time for obtaining preferable parameters. Besides, a cluster can extend from any dense grid 2b to other dense grids 2b nearby through the present invention, so that high clustering speed can be achieved. Moreover, the fixing step S25 can further adjust the clustering result of the present grid-based data clustering method for good performance in noise filtering and jagged edge erasing.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A grid-based data clustering method, comprising:
a parameter setting step setting a size value and a threshold ratio;
a partition step dividing an area including a plurality of data into a plurality of grids;
a searching step counting one of the grids as a seed on a seed list, with data in the grid having not been designated in any cluster, a number of the data in the grid being above a density standard, and the grid being regarded as a dense grid;
a seed-classifying step including a fetching action and a judging action, with the fetching action picking out a first seed on the seed list to be a processing seed and canceling the first seed from the seed list, with the judging action determining whether the processing seed is a dense grid or not and executing an extension step if the processing seed is a dense grid or executing the fetching action again if the processing seed is not a dense grid;
the extension step grouping up data in the processing seed, examining grids abutting against the processing seed whether the data in the examined grids have been designated in any cluster or not, combining the grouped data in the processing seed into a cluster if the data in the examined grids have been designated in the cluster or designating the grouped data into a single cluster, regarding any of the examined grid with no datum designated in any cluster as a seed and adding the seed onto the seed list, counting a total of the seeds on the seed list, and executing a termination step if there is no seed on the seed list or executing the seed-classifying step again if there is still at least one seed on the seed list; and
the termination step determining whether the data in all the dense grids have been designated in any cluster or not, and terminating the grid-based data clustering method if data in any dense grids have been designated in a cluster or executing the searching step if data in any dense grids have not been designated in a cluster.

2. The grid-based data clustering method as defined in claim 1, wherein the density standard is a product of the threshold ratio and a number of data in a densest grid, with the densest grid being a grid with the greatest number of data among all the grids.

3. The grid-based data clustering method as defined in claim 2, wherein the threshold ratio has a value between 0 and 1.

4. The grid-based data clustering method as defined in claim 1, wherein the size value corresponding to sizes of the grids.

5. A grid-based data clustering method, comprising:
a parameter setting step setting a size value and a threshold ratio;
a partition step dividing an area including a plurality of data into a plurality of grids;
a searching step counting one of the grids as a seed on a seed list, with data in the grid having not been designated in any cluster, a number of the data in the grid being above a density standard, and the grid being regarded as a dense grid;
a seed-classifying step including a fetching action and a judging action, with the fetching action picking out a first seed on the seed list to be a processing seed and canceling the first seed from the seed list, with the judging action determining whether the processing seed is a dense grid or not and executing an extension step if the processing seed is a dense grid or executing a fixing step if the processing seed is not a dense grid;
the fixing step determining whether a total of dense grids abutting against the processing seed reaches a reference value, and switching the processing seed to a dense grid and executing a extension step if the total of dense grids abutting against the processing seed reaches the reference value or executing the seed-classifying step if the total of dense grids abutting against the processing seed does not reach the reference value;
the extension step grouping up data in the processing seed, examining grids abutting against the processing seed whether the data in the examined grids have been designated in any cluster or not, combining the grouped data in the processing seed into a cluster if the data in the examined grids have been designated in the cluster or designating the grouped data into a single cluster, regarding any of the examined grid with no datum designated in any cluster as a seed and adding the seed onto the seed list, counting a total of the seeds on the seed list, and executing a termination step if there is no seed on the seed list or executing the seed-classifying step again if there is still at least one seed on the seed list;

the termination step determining whether the data in all the dense grids have been designated in any cluster or not, and terminating the grid-based data clustering method if data in any dense grids have been designated in a cluster or executing the searching step if data in any dense grids have not been designated in a cluster.

6. The grid-based data clustering method as defined in claim 5, wherein the density standard is a product of the threshold ratio and a number of data in a densest grid, with the densest grid being a grid with the greatest number of data among all the grids.

7. The grid-based data clustering method as defined in claim 6, wherein the threshold ratio has a value between 0 and 1.

8. The grid-based data clustering method as defined in claim 5, wherein the size value corresponding to sizes of the grids.

9. The grid-based data clustering method as defined in claim 5, wherein the reference value is 5.

* * * * *